United States Patent

[11] 3,622,388

| [72] | Inventor | Robert Carl Larson |
| | | Pilot Mount, Iowa |
| [21] | Appl. No. | 747,145 |
| [22] | Filed | July 24, 1968 |
| [45] | Patented | Nov. 23, 1971 |
| [73] | Assignee | CPC International Inc. |
| | | continuation-in-part of 529,692, Feb. 24, 1966, now abandoned. This application July 24, 1968, Ser. No. 747,145 |

[54] APPARATUS FOR THE PREPARATION OF A STARCH CORRUGATING ADHESIVE
9 Claims, 4 Drawing Figs.

[52] U.S. Cl........................................... 127/23,
106/213, 127/23, 127/71
[51] Int. Cl........................................... C13l 1/08
[50] Field of Search........................................... 127/1, 23, 28; 106/213

[56] References Cited
UNITED STATES PATENTS

| 2,325,573 | 7/1943 | Thompson................ | 127/28 |
| 3,151,996 | 10/1964 | Desmarais................ | 106/213 |
| 3,228,781 | 1/1966 | Halpert ................... | 106/213 |
| 3,355,307 | 11/1967 | Schoenberger............ | 106/213 |
| 3,423,238 | 1/1969 | Weiland .................. | 127/28 |
| 3,423,239 | 1/1969 | Goos ....................... | 127/28 X |

*Primary Examiner*—Morris O. Wolk
*Assistant Examiner*—Sidney Marantz
*Attorneys*—Frank E. Robbins, James L. Bailey, Janet E. Price, Robert D. Weist and Martha A. Michaels

ABSTRACT: Apparatus for preparing a single starch component corrugating adhesive. An aqueous slurry of starch is treated with caustic under controlled temperature conditions, so as to produce a partially swollen starch corrugating adhesive mixture. Swelling of the starch granules is terminated at a preselected viscosity by the addition of a material such as alum, boric acid, ice, other acid material or the like.

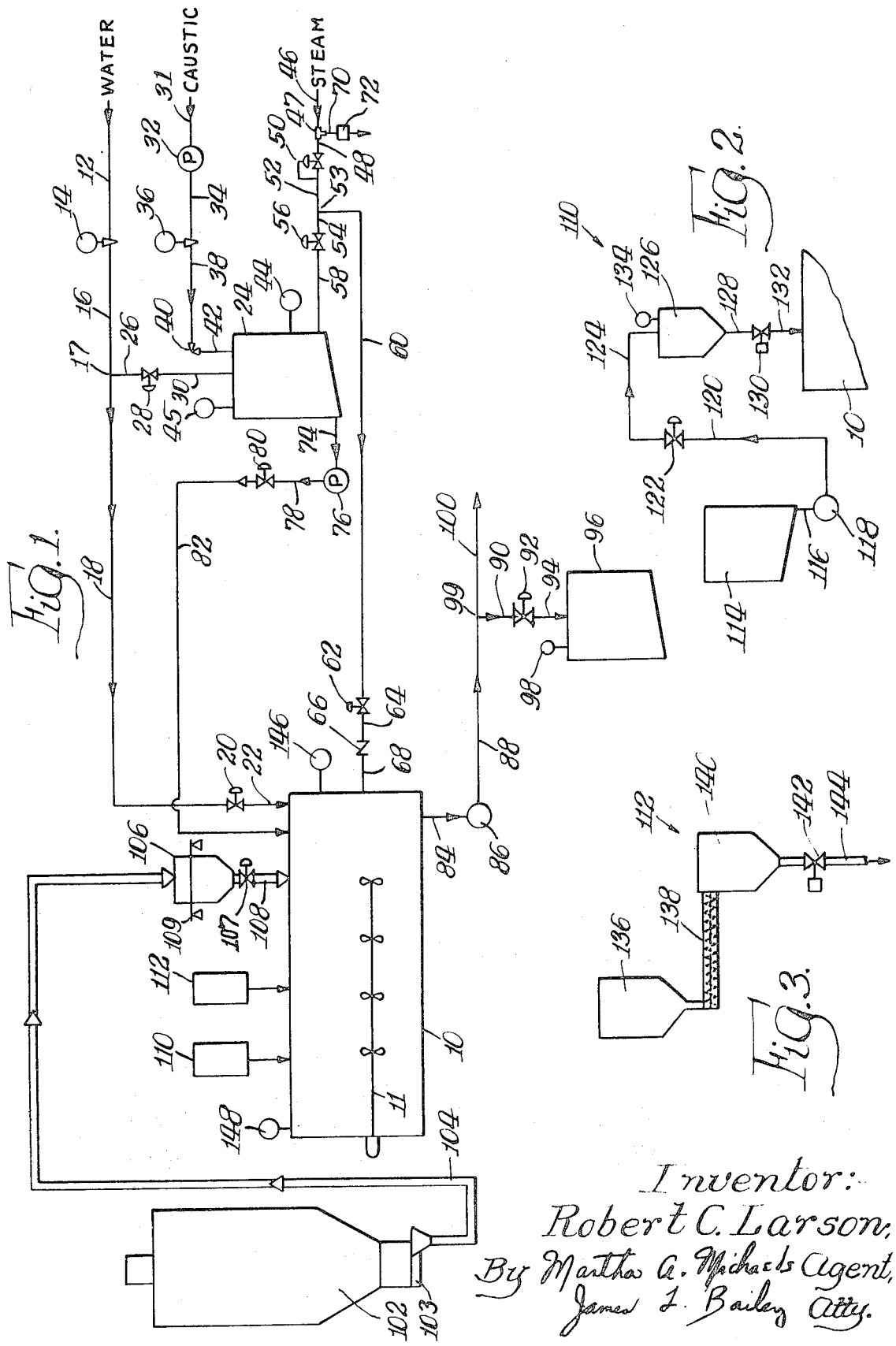

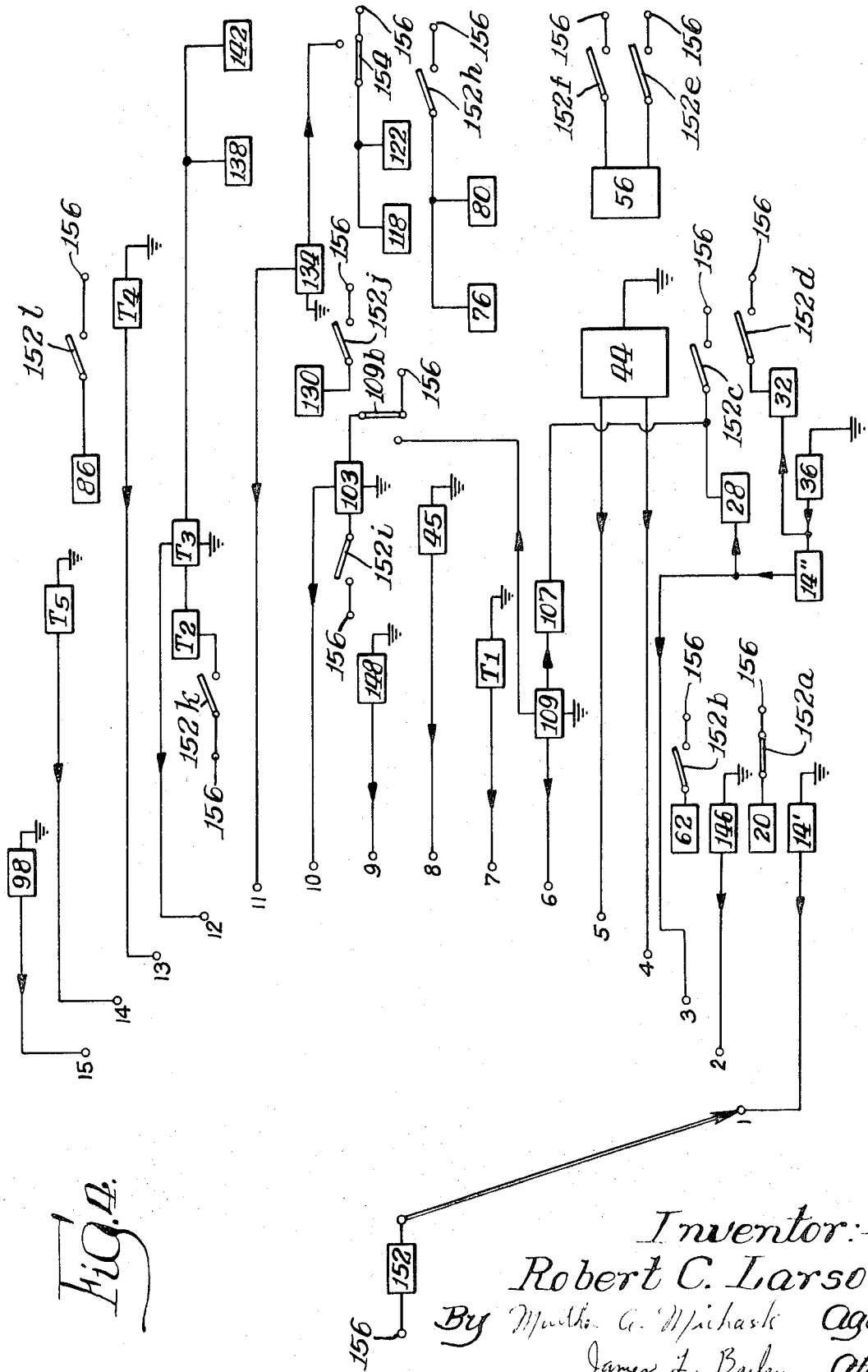

APPARATUS FOR THE PREPARATION OF A STARCH CORRUGATING ADHESIVE

This application is a continuation-in-part of copending application Ser. No. 529,692 filed Feb. 24, 1966 now abandoned.

The present invention relates to an apparatus and process for the preparation of a single starch corrugating adhesive.

Corrugated paperboard presently is manufactured in a continuous operation involving several steps. A strip of paper slightly moistened is passed through heated flute rolls. To one side of the heated flute paper, adhesive is applied to the tip edge of each flute. Immediately thereafter a strip of liner paper is brought into contact with the adhesive treated flutes of the corrugated paper in the presence of heat and pressure, resulting in the formation of a strong adhesive bond. This product is known in the art as "single facer" corrugated paperboard.

Another type of corrugated paperboard is the "double backer." The double backer is prepared by applying adhesive to the exposed flutes of the single facer board, and bonding a second liner to the adhesive tipped flutes. The application of the second liner is different from that of the first liner because less pressure can be applied during the setting and bonding of the adhesive lest the corrugated strip be crushed.

Corrugated paperboards are prepared at machine speeds up to at least 700 feet per minute. Such instantaneous adhesive bonding indeed requires a very special adhesive. The adhesive must be sufficiently viscous to remain in position on the tip of the flutes when applied and yet must be sufficiently flowable to fill any depressions inherently present in the paper along the line of bonding. In addition, the adhesive must be capable of "instant bonding" when heat and light pressure are applied since at present machine speeds even a double backer corrugated paperboard is formed entirely in less than 1 minute.

Starch adhesives are presently being used in the corrugating industry. However, for the most part, the adhesives are two component starch adhesives special mixing machines and holding vessels. The two starch components consist of a carrier starch portion and a raw starch portion. The carrier portion consists of gelatinized starch which when mixed with the raw (ungelatinized) starch portion acts as a carrier or suspending agent for the ungelatinized starch. The strength of a starch adhesive bond in the corrugating industry is dependent upon the swelling and subsequent gelatinization of the ungelatinized starch portion. Thus, it is highly desirable to use a starch formulation wherein the starch is substantially completely ungelatinized.

More recently, single starch component, or "no-carrier" formulations of the type disclosed in U.S. Pat. 3,355,307, have been developed for use in place of the two component formulations. Unmodified ungelatinized starch is not suitable for use in a corrugating adhesive system because the starch will not remain suspended in the aqueous medium to provide an homogenous adhesive composition. In preparing a no-carrier starch adhesive system, ungelatinized starch is chemically treated to produce a suspension containing starch granules in a substantially swollen form, The high-machine speed of industry and the complex chemical treatment of the starch require coordination of an apparatus and process to provide a streamlined system, particularly useful to the corrugating industry.

It is an object of the present invention to provide an apparatus for preparing a finished no-carrier corrugating adhesive.

It is another object of the invention to provide a coordinated process for effecting the complex chemical treatment of starch to provide a no-carrier corrugating adhesive composition.

It is a further object of the invention to provide an apparatus suitable for the control of reaction conditions required for forming a no-carrier corrugating adhesive.

A still further object is to provide an apparatus which is simple to operate and maintain, and which is low in cost and is suitable for preparing a no-carrier starch corrugating adhesive.

Yet another object of the invention is to provide flexibility in starch corrugating adhesive formulations by cooperation of a coordinated process in a special apparatus.

Other objects and advantages of the invention will be apparent from the following description and appended claims.

In the drawings:

FIG. 1 is a schematic flow diagram showing one way in which the apparatus can be arranged in accordance with one preferred embodiment of the invention, to practice the process of the invention for making a single starch corrugating adhesive;

FIG. 2 is a schematic flow diagram, on an enlarged scale, showing a system for adding to the reaction mixture, from which the adhesive is made, a solution of a substance that can participate in stopping further reaction, according to one mode of practicing the invention; and FIG. 3 is a schematic flow diagram, also on an enlarged scale, showing a system for adding to the reaction mixture, from which the adhesive is made, a solid material that can participate in stopping the reaction, in accordance with another mode of practicing the invention.

FIG. 4 is a block diagram showing a preferred embodiment of the programming circuit which regulates the sequence of events in making a single starch corrugating adhesive.

The apparatus of the present invention is intended for either manual or automated preparation of a single starch corrugating adhesive. In one preferred embodiment thereof, it includes a reactor means, preferably a reaction vessel having agitation means, and means for supplying the reactor means with starch and water to form a slurry that is to be treated within the reactor. The apparatus also includes means for controlling the temperature of the slurry within the reactor, together with means for monitoring the viscosity of the reacting starch slurry, as well as means for terminating the reaction upon the detection of a preselected viscosity by the viscosity monitoring means. According to one embodiment of the invention, the reaction terminating means may comprise means for adding solid material, that will stop the reaction, to the slurry that is being treated within the reactor. Alternatively, both the solution adding means and the solid material adding means may be used in sequence.

In its broad aspects, the process of the invention consists of subjecting a starch-water slurry to the effect of caustic and heat in a controlled manner, so as to prevent overgelatinization of the starch, but so as to impart partial swelling to the starch granules. The starch is swelled sufficiently to render the granules self-suspending in the aqueous slurry, and the reaction is then stopped.

The chemical reaction parameters, typical of this system, are set forth in U.S. Pat. No. 3,355,307 and may be summarized as follows:

| | | |
|---|---|---|
| Starch solids by weight of starch aqueous slurry | Less than 50% | Preferably 12%–30%. |
| Caustic quantity | Sufficient for pH 8–13 | Preferably pH 11–12.5. |
| Temperature for conducting the reaction | 70° F.–165° F. | Preferably 100° F.–125° F. |
| Viscosity at termination of reaction (Brookfield) | 300–1,500 centipoises | Preferably 400–900 centipoises. |
| Viscosity of final adhesive (Stein Hall) | 17–50 seconds | Preferably 20–25 seconds. |
| Gel point of final adhesive | 135° F.–160° F. | Preferably 144° F.–152° F. |

Recognition of the interdependency of the parameters is important. For instance, the higher the pH, the lower the temperature required to effect swelling of the starch granules. Conversely, the lower the pH, the higher the temperature or the longer the reaction must be allowed to continue, to obtain equivalent results.

Upon reaching the desired viscosity, it is necessary to stop the swelling action. Stopping of the reaction may be accomplished by placing the conditions of the slurry outside those required for the swelling of starch. Suitable methods include cooling, adjusting the pH, or adding a reaction stopper. Suitable reaction stoppers include acid, ice, alum, boric acid, borax, cold water, or the like.

Referring now in detail to FIG. 1 by numerals of reference, the numeral 10 denotes a tank that is equipped with an agitator 11, for making up the slurry. A supply line 12 is provided to supply water through a flow meter 14 and a line 16 to a T-junction 17. A line 18 continues from the T-junction 17 through a control valve 20 and a line 22 into the tank 10.

Also connected to the T-junction 17 is a supply line 26 to supply water through a control valve 28 and a line 30 to the caustic dilution tank 24.

A line 31 is provided to supply concentrated caustic solution for use in the system. This line 31 is connected to a pump 32, that is disposed to advance concentrated caustic through a line 34 to a flow meter 36. A line 38 connects the flow meter 36 to a back pressure valve 40. A line 42 is disposed to discharge the caustic flowing through the back pressure valve 40 into the dilution tank 24. The dilution tank 24 is provided with a temperature control unit 44 and a liquid level control 45.

A line 46 is disposed to supply steam through a tee 47, a line 48, and a pressure reducing valve 50, into a line 52, that connects through a T-junction 53 to a line 54. The line 54 is disposed to discharge the steam through a control valve 56 and a line 58 into the caustic dilution tank 24.

A line 60 interconnects the T-junction 53 through a control valve 62 to a line 64. The line 64 is connected through a check valve 66 with a line 68, that is disposed to discharge steam into the tank 10.

An auxiliary line 70 also is connected from the other arm of the tee 47, to a trap 72, that vents to the atmosphere.

A drain line 74 is connected to the lower end of the caustic dilution tank 24. This line 74 is disposed to connect the tank 24 to a pump 76. The pump 76 is disposed to advance the diluted caustic from the tank 24 through a line 78 to a control valve 80. This control valve 80 is connected through a line 82 with the makeup tank 10.

The tank 10 is provided with a discharge line 84. This line 84 is connected to a pump 86, which can advance the discharged material through line 88, a tee 99, a line 90, a manually adjustable valve 92, and a line 94, into a storage tank 96. The storage tank 96 is provided with a liquid level control 98. The other arm of the tee 99 is connected through a line 100 to storage facilities (not shown).

A dry starch storage bin 102 is provided as a source of starch for the makeup tank 10. It is provided with a conveying device 103 (such as a screw conveyor) which conveys the starch from the storage bin 102 through a discharge conveying duct 104 to an automatic scale 109 situated within a hopper 106. The hopper 106 has a delivery conduit that discharges the weighed starch through a control valve 107 into the makeup tank 10.

A liquid additive system denoted generally by the reference number 110 is mounted for feeding into the makeup tank 10. This system is shown in more detail in FIG. 2. The liquid additive system consists of a solution supply tank 114 which is provided with a discharge line 116. The discharge line 116 is connected to a pump 118, which can deliver the solution through a line 120, a control valve 122, and a line 124, to the holding tank 126. A drain line 128 is connected to the base of the holding tank 126, for discharging solution through a control valve 130 and a line 132 into the makeup tank 10. The solution holding tank 92 is provided with a liquid control unit 134.

Again referring to FIG. 1, a solids additive system 112 is also mounted for feeding solids into the makeup tank 10. This solids additive system 112 is shown in more detail in FIG. 3. As shown in FIG. 3, this system includes a solids storage hopper 136 for storing the solid material. A screw conveyor 138 is connected to the base of the solids hopper 136, and is disposed to discharge into a feed hopper 140. The solids feed hopper 140 discharges through a control valve 142 and an exit port 144, into the makeup tank 10.

Referring again to FIG. 1, the makeup tank 10 is provided with a temperature control unit 146 and a viscosity control unit 148. The viscosity control unit consists of a viscometer for continuously measuring and reporting the viscosity, and an actuating means such as, for example, an electrical circuit that is arranged to operate a solenoid activated pneumatic valve, which actuates either the liquid additive system or the solids additive system, according to the process being used when a predetermined viscosity value is obtained.

This apparatus is utilizable either manually by one or more operators, or automatically by means of electrical circuit. In fact any degree of automation may be easily achieved by the application of electrical circuitry to any one or several parts of the apparatus. For example, an apparatus installed for manual operation would contain manually adjustable control values whereas in a totally automated system the control valves could be solenoid activated pneumatic valves in contact with an appropriate electrical circuit or some other suitable automatic valve control mechanisms.

Referring now to FIG. 4, the apparatus is automatically controlled by an automatic programmer 152 in the following manner. In the embodiment shown, the programmer includes a solenoid operated stepping switch, and a series of contact switches 152a, 152b, ..., which connect the elements being controlled to a terminal 156 coupled to a source of AC, or other potential source. Each of the switches 152a, 152b, ... is normally open, but each is closed at the initiation of the step which controls its associated controlled element, and each remains closed for the duration of that step except as otherwise specifically indicated below.

The programmer 152 is stepped to succeeding steps by feedback signals generated in the various controlling devices which will be described below. The feedback signals are indicated in FIG. 4 by arrows denoting a reverse current flow, and these signals effectively complete a circuit from each such controlling element to the programmer 152 to advance the programmer by unit steps to the next succeeding step.

In a continuous operation, the finished adhesive, ready for use, is ordinarily stored in the tank 96 (FIG. 1). The level control unit 98 can be preset to indicate when the level of finished adhesive is so low that the supply should be replenished.

With the programmer at step 1, which for convenience will be used as the first step in the process, the contact switch 152a is closed, thereby providing AC potential to open the water valve 20 to permit water to flow into the mixer 10. The valve 20 is maintained in its opened position until a counter 14' of the flow meter 14 indicates that a predetermined quantity of water has passed to the mixer 10. At this time the counter 14' generates a feedback signal to advance the programmer to the second step.

In addition, at the initiation of step 1, a normally open switch 154 is closed, actuating the pump 118 and opening the valve 122 to transfer the liquid additive from the solution supply tank 114 to the holding tank 126. The switch 154 remains closed until a predetermined high-liquid level is measured by the level control 134, at which time a feedback signal is generated in the level control 134 and applied to the switch 154 to break the connection.

With the programmer at step 2, the switch 152b is operative to couple AC potential to the valve 62 to permit the flow of steam into the mixer 10. When the programmer advances to step 2, the agitator 11 is also actuated and is maintained in that state through several steps. The steam flow is maintained until a predetermined temperature is registered on a temperature control unit 146, which then generates a feedback signal to advance the programmer to step 3.

When the programmer has reached step 3, the valve 107 is opened to add the starch to the heated water. This valve remains open until the scale 109 indicates that the hopper 106, which contains a preweighed quantity of starch, has been fully discharged. The valve 107 is then closed. Also when the programmer moves to step 3, the switches 152c and 152d couple the AC potential to actuate the valve 28 and to actuate the pump 32, thereby passing water and caustic to the dilution tank 24. After passage of a predetermined amount of water into the tank 24, a second counter 14" of the flow meter 14 generates a feedback signal which immediately closes the valve 28. The flow meter 36 generates a feedback signal to denote a predetermined quantity of caustic in the tank, and this feedback signal immediately deactivates the pump 32. When both of these feedback signals have been generated the circuit is completed to the programmer 152, and the programmer is thus advanced to step 4.

At step 4 the AC potential is coupled to the valve 56 across the contact switch 152e to fully open that valve so as to allow steam to enter the dilution tank 24. When the mixture in the dilution tank 24 reaches a predetermined temperature, the temperature control unit 44 generates a feedback signal to advance the programmer 152 from step 4 to step 5.

At step 5 the AC potential is applied to the valve 56 across the contact switch 152f, and the valve is maintained in a partially opened condition. When the temperature control unit 44 indicates that the final temperature has been reached in the tank 24, a second feedback signal is generated to advance the programmer 152 to step 6.

At step 6 operation of the programmer 152 is delayed until the scale 109 registers complete discharge of the starch from the hopper 106 to the tank 10 at which time the scale 109 generates a feedback signal to advance the programmer 152 to step 7.

At step 7 a timer $T_1$ is activated to initiate a time delay period to insure complete dispersion of the starch in the water. At the end of the time period provided by the timer $T_1$ the timer generates a feedback signal to step the programmer 152 to step 8.

At step 8 the AC potential is coupled over a switch 152h to actuate a pump 76 and to open a valve 80 to deposit the heated caustic solution in the mixer 10. When the solution in the dilution tank 24 has reached a predetermined level, a feedback signal is generated by a level control unit 45 to step the programmer 152 to step 9.

The process is delayed at step 9 until the viscometer 148 registers a predetermined viscosity of the mixture within the mixing tank 10. At that time, a feedback signal is generated to step the programmer 152 to step 10.

At step 10 the AC potential is applied over a switch 152j to open the valve 130 to deposit the contents of the liquid additive holding tank 126 to the mixing tank 10. AC potential is also applied over a switch 152i to actuate the starch conveying device 103. Actuation of the conveying device 103 in turn generates a feedback signal to step the programmer 152 to step 11. However, the conveying device 103 is maintained in its actuated state by a separate holding circuit until a feedback signal from the scale 109 (indicating that a predetermined amount of starch has been deposited in the hopper 106) deactivates the holding circuit. The holding circuit is depicted in FIG. 4 by the normally closed contact switch 109b.

At step 11 the AC potential is still applied over the switch 152j to maintain the valve 130 in its open position. A second feedback signal is generated from the level control 134 indicating that a low-level of the liquid additive has been reached, and this feedback signal advances the programmer 152 to step 12.

At step 12 the AC potential is applied over a switch 152k to initiate a timer $T_2$ to provide a predetermined time delay after the valve 130 has been closed. After a suitable interval, the timer $T_2$ activates a timer $T_3$ which actuates a conveyor 138 and opens a valve 142 to deposit the solid additive to the mixture in the mixing tank 10. After an appropriate interval, the timer $I_3$ operates so that a feedback signal is generated to advance the programmer 152 to step 13.

At step 13, a time delay device $T_4$ is activated to permit complete mixing of the solid additive with the contents of the tank 10. After a suitable mixing period, the timer $T_4$ operates so that a feedback signal is generated by it to advance the programmer 152 to step 14. When the programmer 152 is advanced to step 14, the agitator 11 is stopped.

At step 14 the AC potential is applied over the switch 152l to actuate a pump 86 for transfer of the contents of the mixing tank 10 into a storage tank 96. Also, at step 14 a timer $T_5$ is activated, which generates a feedback signal after a predetermined time interval to advance the programmer 152 to step 15.

When the programmer has been advanced to step 15, a cycle has been completed, and the programmer will remain at step 15 until receipt of a feedback signal from the level control 99 (which would indicate that a predetermined low level of adhesive has been reached in tank 96). This feedback signal completes a circuit between level control 98 and programmer 152, to return the programmer 152 to step 1, to begin a new cycle.

In another embodiment, only a single solid additive might be employed, in which case the system denoted by FIG. 2, would be superfluous, as would the associated elements in FIG. 4, such as switch 154, pump 118, valve 122, valve 130, level control 134, timer $T_2$ and switch 152k. That is, at step 10 the AC potential would actuate the conveyor 103 over the switch 152i, and simultaneously, the AC potential would be applied over the switch 152j to actuate the timer $T_3$, which in turn actuates the conveyor 138 and the valve 142. As in the previously discussed embodiment, activation of the conveyor 103 would advance the programmer 152 to step 11, at which step the AC potential would be applied over the switch 152j to actuate the conveyor 138 and the valve 142. In this embodiment, the feedback from timer $T_3$ would advance the programmer 152 form step 11 directly to step 13.

The foregoing description described embodiments of the invention in which a stepping type switch is employed to program the apparatus It should be realized, of course, that many other suitable circuits could be employed to provide the proper sequence of events. For example, it is readily apparent that a suitable relay logic coupled to the control elements herein in a similar manner would achieve the desired sequence.

When performing a typical example of the process, in the preliminary stage of the operation the scale 106 is filled with dry ungelantinized starch from the storage bin 102. Shortly thereafter the water valve 20 is opened, permitting water to flow into the makeup tank or mixer 10. The water meter 14 measures the proper quantity of water for the mixer 10, then the water valve 20 is closed. Next, the steam valve 62 is opened and water in the mixer 10 is heated by the steam transmitted through line 68. When the desired predetermined temperature of the water in the mixer 10 is reached, the temperature control unit 146 operates to close the steam valve 62, to discontinue heating of the water.

At this time, a preweighed amount of dry starch is admitted to the mixer 10 from the scale 106 via the discharge line 108. While the starch is being admitted to the mixer 10, the water valve 28 is opened and the pump 32 is energized, whereupon water and caustic are simultaneously introduced into the dilution tank 24. In this connection, the water meter 14 measures the proper quantity of water, and then the water valve 28 is closed. The caustic meter 36 measures the proper quantity of caustic and then the pump 32 is stopped. Next, the steam valve 56 is opened, admitting steam to the dilution tank 24 for heating the caustic and water to produce a heated aqueous caustic mixture of a predetermined temperature and concentration. When the caustic and water mixture in the dilution tank 24 reaches the predetermined temperature (about 10° below the final desired temperature) the steam valve 56 is adjusted to reduce the steam flow, and when the final desire temperature of the mixture in the dilution tank 24 is reached, the steam valve 56 is closed, to discontinue heating. The valve 107, controlling the admission of starch to the tank 10, closes when the scale 109 registers complete discharge of the starch. Upon reaching the predetermined setting, the scale 109 actuates a timer (not shown). The timer delays advancement of the system to the next step so as to insure adequate mixing in the tank 10 to evenly disperse the starch in the water.

After a suitable mixing period, the timer operates so that the valve 80 is opened to a predetermined setting, to permit transport of the heated aqueous caustic mixture from the dilution tank 24 to the tank 10 by means of the pump 76. When the dilution tank 24 is nearly empty, the pump 76 is stopped, and the valve 80 is close.

The aqueous caustic mixture entering the tank 10 is intermixed with the starch slurry therein by the agitator 11. The pH level and temperature are regulated so that the starch granules begin to swell. During swelling, viscosity is increased. When the desired predetermine viscosity of the starch slurry is reached, as measured by the viscosity control unit 148, the valve 130 is opened, permitting the flow of the liquid additive from the additive tank 126 to the mixer 10. The valve 130 is closed at a predetermined liquid level, as measured by the level control 134 and a timer (not shown) is started. After a predetermined time as measured by the timer, the solids additive system is actuated to add solid material to the mixer 10 by opening the valve 142. The solids are added over some preselected period of time, thereby controlling the quantity added. At the end of this time period, the completed corrugating adhesive is mixed in the tank 10 for a preselected period of time. At the end of this hold time, the delivery pump 86 is energized for delivering the finished corrugating adhesive to the storage tank 96.

Upon completion of the step of pumping the finished adhesive to the storage tank 96, the system is ready for the preparation of another batch of adhesive.

The following examples illustrate the practice of the invention. All percentages are by weight and all temperatures in degrees Fahrenheit unless otherwise specified.

EXAMPLE 1

Water in the amount of 427 gallons was metered into the makeup tank 10 and heated to 95° F. Starch in the amount of 1,100 pounds was then added and mixed. In the caustic dilution tank 24, 109 gallons of water and 5.6 gallons of 50 percent caustic were mixed and heated to 110° F. The caustic solution was then discharged slowly to the makeup tank 10 over a period of 5 minutes. The viscosity of the swelling starch slurry was monitored by the viscosity control unit 148, and when a viscosity of 650 c.p.s. (Brookfield) was reached, the liquid additive system 110 was actuated and an alum solution containing 5 lbs., of alum in 30 lbs., of water was added to the makeup tank 10. The timer was started at the beginning of the alum addition, and after 2 minutes the addition of the borax additive was begun from the solid additive system 112. Borax in the amount of 24 lbs. was added and the entire mixture was agitated for 10 minutes, yielding a finished no-carrier corrugated adhesive composition.

The total reaction time was 17 minutes and the reaction temperature in the makeup tank was 104° F. After 30 minutes the adhesive mixture had a Stein Hall viscosity of 20.

The adhesive was used to manufacture single facer board at 600 feet per minute. The resulting board exhibited excellent bonding characteristics with little or no tendency to warp.

EXAMPLE 2

Another batch of adhesive was prepared as in example 1 except that a single additive, powdered boric acid, was used to replace the two additives used in example 1, alum and borax by use of the solids additive system 112.

When the viscosity of the starch slurry reached 650 c.p.s., 18 lbs., of boric acid was added to the makeup tank, to stop the reaction.

The total reaction time was 19 minutes and the reaction temperature was 102° F.

The corrugated board manufactured from this adhesive was comparable to that of example 1.

EXAMPLE 3

Several adhesive batches were prepared as in examples 2 except that different quantities of boric acid were used, as shown in table 1.

TABLE 1

| Sample No. | A | B | C | D |
|---|---|---|---|---|
| add time of caustic (min.) | 7' | 5' | 4'15" | 4'50" |
| reaction temperature, °F. | 102 | 104 | 102 | 100 |
| reaction time (min.) | 20 | 17 | 19 | 23 |
| boric acid in lbs. | 6.5 | 13.2 | 18 | 20 |
| viscosity at "kill" time (c.p.s.) | 625 | 700 | 820 | 500 |

Corrugated boards ranging from satisfactory to excellent were produced from the above compositions.

EXAMPLE 4

Several adhesive batches were prepared as in example 3 except that a boric acid solution was used as the single additive. The boric acid solution was added by means of the liquid additive system 110 actuated by the viscosity control unit. The amounts and reaction conditions were as shown in table 2.

TABLE 2

| Sample Number | E | F | G | H | J | K |
|---|---|---|---|---|---|---|
| Add time of caustic (min.) | 5'35" | 4'45" | 4'45" | 4'45" | 4'50" | 4'35" |
| Reaction temp. ° F. | 103 | 101 | 102 | 102 | 101 | 102 |
| Reaction time (min.) | 11 | 17 | 16 | 12 | 12 | 17 |
| Boric acid solution: | | | | | | |
| Boric acid (lbs.) | 20 | 20 | 20 | 24 | 16 | 20 |
| Caustic (lbs.) | 4.4 | 4.4 | 4.4 | 4.4 | 4.4 | 4.4 |
| Water (gals.) | 24 | 24 | 24 | 24 | 24 | 24 |
| Viscosity at kill time (cps.) | 390 | 470 | 600 | 560 | 540 | 530 |

Corrugated boards exhibiting excellent bonding and no warp were made from each of the batches above.

The above processes and apparatus may be modified in several ways. For instance, a third additive system can be added to follow in sequence any of the other additive systems for the purpose of adding a resin material to yield a waterproof corrugating adhesive. Still another additive system could also be used to add a preservative, fungistat, or the like. Similarly one of the two additive systems already present is easily adapted for addition of other materials.

While the invention has been described in connection with specific embodiments thereof, it will be understood that it is capable of further modification, and this application is intended to cover any variations, uses or adaptations of the invention, following in general, the principles of the invention and including such departures from the present disclosure as come within known or customary practice in the art to which the invention pertains and as may be applied to the essential features hereinbefore set forth and as fall within the scope of the invention and the limits of the appended claims.

I claim:

1. Apparatus for making a single starch corrugating adhesive composition comprising:
   - a vessel for reacting a starch slurry with caustic at a preselected reaction temperature to form a partially swollen starch suspension;
   - means for preheating a caustic solution to a temperature close to or above the preselected reaction temperature;
   - means for preheating the aqueous vehicle for the starch slurry to a temperature close to the preselected reaction temperature;
   - means including said vessel for mixing together the slurry of starch in its preheated aqueous vehicle and the preheated caustic solution;
   - said vessel being provided with:

1. a temperature control unit for controlling the temperature of the starch slurry and of the reaction mixture;
2. a viscosity control unit for monitoring the viscosity of the reaction mixture, and
3. means operative upon the detection of some predetermined viscosity value of the reaction mixture for stopping the reaction;

said viscosity control unit being operable to actuate said stopping means upon the detection of the predetermined viscosity value of the reaction mixture, and said stopping means comprising means for the addition of at least one additive to the reacted starch slurry to stop the reaction and to provide a single starch corrugating adhesive composition of predetermined characteristics.

2. Apparatus in accordance with claim 1 wherein the viscosity control unit comprises monitoring means for monitoring the viscosity and means for actuating the addition of solid boric acid to the partially swollen starch suspension in the reaction vessel.

3. Apparatus in accordance with claim 1 wherein the viscosity control unit comprises means for monitoring the viscosity and means for actuating the addition of alum and borax in sequential steps to the reacting slurry for adding first alum and then borax after a predetermined period of time.

4. Apparatus for making a single starch corrugating adhesive composition comprising:

a vessel for reacting a starch slurry with caustic at a preselected reaction temperature to form a partially swollen starch suspension;

means for preheating a caustic solution to a temperature close to or above the preselected reaction temperature;

means for preheating the aqueous vehicle for the starch slurry to a temperature close to the preselected reaction temperature;

means including said vessel for mixing together the slurry of starch in its preheated aqueous vehicle and the preheated caustic solution;

said vessel being provided with:

1. a temperature control unit for controlling the temperature of the starch slurry and of the reaction mixture;
2. a viscosity control unit for monitoring the viscosity of the reaction mixture;
3. means operative upon the detection of some predetermined viscosity value of the reaction mixture for stopping the reaction, said stopping means comprising means for the addition of at least one additive to the reacted starch slurry to stop the reaction and to provide a single starch corrugating adhesive composition of predetermined characteristics, and electrical circuit control means for causing the apparatus to operate in a predetermined sequence of steps after an operator has energized the circuitry, said sequence of steps being to:

add the starch to the preheated water in the vessel;
add the preheated caustic to the starch slurry in the vessel;
heat an mix the starch and caustic solutions to cause the mixture to react;
monitor the viscosity of the reaction mixture;
actuate the means for stopping the reaction upon the detection of some predetermined viscosity value of the reaction mixture by the viscosity control unit, and
mix the reaction stopping additive with the reacted starch slurry to stop the reaction and to provide a single starch corrugating adhesive composition of predetermined characteristics.

5. Apparatus in accordance with claim 4 wherein the apparatus is automatically controlled by an automatic programmer including a solenoid operated stepping switch and a series of contact switches which connect the elements being controlled to a terminal coupled to a potential source.

6. Apparatus in accordance with claim 5 wherein the programmer is stepped to succeeding steps by feedback signals generated in the temperature control unit and in the viscosity control unit.

7. An automated apparatus for making a single starch corrugating adhesive composition comprising:

a mixing tank in which a single starch corrugating adhesive can be made;
means for supplying water to the tank;
means for heating the water in the tank to a temperature close to the reaction temperature;
means for adding starch to the preheated water in the tank;
means for preheating a caustic solution to a temperature close to or above the reaction temperature;
means including said mixing tank for mixing together and heating the slurry of starch in its preheated aqueous vehicle and the preheated caustic solution, to provide a substantially uniform, heated reaction mixture;
a viscosity detection instrument disposed in said tank for monitoring the viscosity of the reacting contents of the tank; and
means operative upon the detection of predetermined viscosity as detected by said instrument for stopping the reaction in the tank including means responsive to said instrument for adding to the tank a chemical reaction stopper to stop the reaction.

8. Apparatus in accordance with claim 7, wherein said means for stopping the reaction comprises means for the addition of at least one additive to the contents of the tank.

9. An automated apparatus for making a single starch corrugating adhesive composition comprising:

a mixing tank in which single starch corrugating adhesive can be made by reacting a starch slurry with a caustic solution at a preheated reaction temperature;
means for supply water to the tank;
means for preheating the water in the tank;
means for supplying starch to the tank and mixing it with the preheated water to form a substantially uniform slurry;
means for preheating a caustic solution to a temperature close to or above the preselected reaction temperature;
means including said tank for mixing together the preheated slurry of starch and the preheated caustic solution;
a viscosity detection instrument disposed in said tank for monitoring the viscosity of the reacting contents of the tank; and
an automatic programmer including a solenoid operated stepping switch, said stepping switch causing the apparatus to operate in a sequence of steps after an operator has energized the circuitry, said sequence of steps being to:

add water to the mixing tank;
add steam to heat the water in the mixing tank;
monitor the temperature of the water in the mixing tank;
terminate the supply of steam to the mixing tank when the water is preheated to a temperature close to the preselected reaction temperature;
add the starch to the heated water and admix it therein to form a substantially uniform slurry;
add the preheated caustic solution to the slurry;
heat and agitate the contents of the tank;
hold the contents of the tank substantially at the preselected reaction temperature;
add the starch to the heated water;
monitor the viscosity of the reacting contents of the tank, and, upon the detection of a predetermined viscosity, deposit the chemical reaction stopper in the mixing tank, and agitate the contents of the mixing tank to terminate the reaction, thereby forming a single mix starch corrugating adhesive.

* * * * *

PO-1050
(5/69)

UNITED STATES PATENT OFFICE
CERTIFICATE OF CORRECTION

Patent No. 3,622,388  Dated November 23, 1971

Inventor(s) Robert Carl Larson

It is certified that error appears in the above-identified patent and that said Letters Patent are hereby corrected as shown below:

Column 1, line 37 insert the word --requiring-- after adhesives;

Column 3, line 66, insert the word --level-- after the word liquid;

Column 5, line 68, "$I_3$" should be --$T_3$--;

Column 6, line 33, insert a period after the apparatus;

Column 6, line 67, "desire" should be --desired--;

Column 7, line 6, "close" should be --closed--;

Column 7, line 11, "predetermine" should be --predetermined--;

Column 9, line 56, "an" should be --and--;

Column 10, line 35, in Claim 9, "supply" should be --supplying--.

Signed and sealed this 9th day of May 1972.

(SEAL)
Attest:

EDWARD M. FLETCHER, JR.  ROBERT GOTTSCHALK
Attesting Officer  Commissioner of Patents